United States Patent [19]
Nudelman et al.

[11] Patent Number: 5,306,907
[45] Date of Patent: Apr. 26, 1994

[54] X-RAY AND GAMMA RAY ELECTRON BEAM IMAGING TUBE HAVING A SENSOR-TARGET LAYER COMPOSED OF A LEAD MIXTURE

[75] Inventors: Sol Nudelman, Avon; Donald R. Ouimette, Plantsville, both of Conn.

[73] Assignee: The University of Connecticut, Farmington, Conn.

[21] Appl. No.: 30,588

[22] Filed: Mar. 12, 1993

Related U.S. Application Data

[63] Continuation-in-part of Ser. No. 728,652, Jul. 11, 1991, Pat. No. 5,195,118.

[51] Int. Cl.⁵ .......................................... H01J 40/14
[52] U.S. Cl. ............................ 250/214 VT; 313/548; 378/58.2
[58] Field of Search ............... 250/214 VT; 313/548; 378/99, 101; 358/111

[56] References Cited

U.S. PATENT DOCUMENTS 4,069,438  1/1978  Houston et al. ............. 250/214 VT
4,862,006  8/1989  Vieux et al. ................. 250/214 VT Primary Examiner—David C. Nelms
Assistant Examiner—Teresa Davenport

[57] ABSTRACT

A large area video camera is suitable for high energy imaging applications. The sensor-target of the camera tube is composed of TlBr, TlI, $PbI_2$, or $PbBr_2$ or a two layer structure comprising CsI and a photoconductive layer of materials such as amorphous silicon, amorphous selenium, cadmium sulphide, antimony trisulfide or antimony sulphide oxysulphide. A disclosed tube incorporates various modifications for dealing with problems associated with stray capacitance, premature electron leakage and secondary electron emission.

20 Claims, 5 Drawing Sheets

X-RAY AND GAMMA RAY ELECTRON BEAM IMAGING TUBE HAVING A SENSOR-TARGET LAYER COMPOSED OF A LEAD MIXTURE

CROSS-REFERENCE TO RELATED APPLICATION

This application is a continuation-in-part of application No. 07/728,652 filed on Jul. 11, 1991 U.S. Pat. No. 5,195,118.

BACKGROUND OF THE INVENTION

This invention relates generally to scanning image tubes employed in video cameras. More particularly, the present invention relates to devices which have a photoconductive sensor-target with a relatively large area and capacity suitable for applications such as X-ray imaging.

Video camera tubes to which the present invention relates employ a low velocity electron beam (LV beam) and a very high resistivity photoconductive sensor-target. As used in this application, low velocity electron beams generally refer to electron beams which strike the sensor-targets with sufficiently low velocities that secondary emissions are not produced.

The photoconductive type sensor-target employed in video camera tubes has two functions. First, the sensor detects irradiating photons. Second, the target functions to hold electrons deposited on its inner target surface by the electron beam as the LV beam scans out a raster. In low velocity no gain tubes to which the invention relates, an electron beam scans the inside surface of the sensor-target in a raster scanning fashion. The electrons strike the sensor-target surface with low energy and the electrons are uniformly deposited across the surface of the sensor-target to drive the potential across the surface to approximately the potential of the electron gun cathode which is conventionally, but not necessarily, at ground. Modification of the charge on the sensor-target resulting from projection of a optical image onto the input sensor surface of the image tube generates a time varying video signal as the LV beam scans through the raster. The image is obtained on a successive pixel basis as electrons lost at the target surface through image formation are replaced by the scanning electron beam.

The sensor function of the sensor-target is accomplished by an insulating, photoconductive material responsive to the incident radiation to be imaged which has a resistivity on the order of $10^{12}$ ohms per centimeter. The high resistivity is required in order to maintain sufficient electron charge storage and electron immobility on the inner scanner surface of the sensor-target during the raster scanning. On exposure of the sensor-target to incident radiation from an image of an object or specimen, such as, for example, a chest X-ray, a resulting charge flow through the sensor-target medium results in electrons being lost from the scan surface. The changing radiation intensity which comprises the incident image results in a proportional electron loss on the target surface. The electronic image is thus read out by the scanning electron beam.

Various photoconductive targets suitable for use in conjunction with low velocity electron beams have been identified. Miller in Proc. Phys. Soc., Vol 50, 374 (1938) disclosed photoconductive targets which employed selenium, zinc sulphide, cadmium sulphide, thallium sulphide, antimony sulphide, zinc selenide, cadmium selenide and zinc telluride. H. G. Lubszynski U.S. Pat. No. 2,555,091, P. Weimer U.S. Pat. No. 2,654,853, P. Weimer U.S. Pat. No. 2,687,484 and R. Goodrich U.S. Pat. No. 2,654,852 disclose devices which employ a photoconductive sensor-target tube. The noted Weimer and Goodrich patents disclose devices which employ a uniform layer of antimony trisulphide as the sensor-target material in a device known as the Vidicon TM tube. L. Heijne U.S. Pat. No. 2,890,359 discloses a tube which employs a lead oxide sensor-target and which became a prominent television tube marketed under the Plumbicon TM mark. The tube disclosed in the Heijne patent incorporates a p-i-n junction which exhibits less lag than the previous conventional tubes.

There have been a number of systems advanced which employ video tubes in connection with X-ray imaging. Mackay U.S. Pat. No. 4,852,137 discloses a method and an apparatus wherein X-rays and high energy photons are transmitted through a specimen and visible light emitted by the secondary source is detected by a cooled slow readout CCD. While there have been successful small diameter tubes, e.g., on the order of a few inches in diameter, attempts to transform small diameter tube technology to large diameter tube configurations have encountered significant technical problems, including difficulties in employing sensor-target layer compositions such as lead oxide on a large diameter scale, unacceptable stray capacitance and associated unacceptable noise characteristics. Partial solutions to some of the technical problems have been advanced in the conventional small diameter tube context. Van de Polder et al U.S. Pat. No. 4,059,840 discloses the use of a signal electrode comprised of vertical, multiple strips to deal with the problem of stray capacitance in television tubes. Heretofore scaling conventional small diameter tubes to large diameter tube configurations which are more suitable for high energy imaging, such as X-ray and gamma ray imaging, has presented formidable technical obstacles. In summary, large area ionizing radiation sensitive LV-type tubes have not found widespread success due to an absence of a suitable electronics designs and an absence of suitable sensor-target materials.

A number of earlier video tube designs were disclosed by the co-inventor of the present invention in Nudelman U.S. Pat. No. 4,794,635. The latter patent discloses a number of devices and features directed to overcome the deleterious effects of high capacitance in large area raster scanner imaging tubes employed in video cameras. The use of CsI as one component of a sensor-target is also disclosed. Among the novel features disclosed in the patent are the use of a plurality of selectively oriented signal electrode strips and a multiple layer, solid state structure which provides a displaced electron layer sensor-target (DELST) for imaging with and without photoconductive gain and with and without intensifier gain. In the DELST structure, various features are selected and combined to provide a scanner suitable for various applications and which satisfy various specifications such as speed, spatial resolution, dynamic gain, and sensor-target characteristics as well as cost.

Conventional LV-type tubes which are scaled to larger areas exhibit excessive lag due to the the high beam resistance and the large charge storage capacity. Excessive storage capacity ordinarily result from increasing the size of the target, increasing the dielectric constant of the sensor-target medium and/or decreasing the thickness of the sensor-target medium.

As an additional design consideration, a high DQE which approaches 100% is a desired feature for an optimal scanner tube. A DQE of 100% represents a sensor having quantum efficiency wherein the output noise is only limited by the photon noise at the input where the image is initially projected. In practice, photon noise should dominate all other electronic sources of noise, and the modulation transfer function (MTF) of the tube and its dynamic range must match the imaging requirements for an application.

The large area imaging required in diagnostic radiology, nuclear medicine, non-destructive testing and other technologies can be successfully accomplished by a detailed reconsideration of the underlying rationales for the materials, structures and functions of conventional video tube designs. For such large area applications, real time imaging may not be required. Moreover, the spatial resolution requirements are not as demanding as the requirements for conventional television camera tubes. These relaxed constraints are important in connection with successfully overcoming the very significant capacitance problems associated with large area video tubes.

SUMMARY OF THE INVENTION

Briefly stated, the invention in a preferred form is a new and improved low velocity electron beam, photoconductive-type image tube which employs novel sensor-target configurations and incorporates a modified electron optical system to acquire large images defined by penetrating ionizing radiation, such as X-rays and gamma rays, and is suitable for applications in nuclear medicine, diagnostic radiology and non-destructive testing. In addition, the LV-type video tubes provided by the invention are capable of use with non-penetrating radiation such as very short wavelength ultraviolet. The invention is particularly advantageous in connection with large area video tube applications.

In one embodiment, a large area X-ray sensitive video camera tube has a sensor-target including a signal plate for detecting irradiating photons and for providing sufficient storage capacity to hold the electrons on the surface of the signal plate. The target includes a scintillator which comprises a layer substantially composed of CsI. The CsI layer generates a visible light photon output proportional to the absorbed radiation. A photoconductor which is responsive to the light photon output forms an electronic image of the radiation and comprises a substrate substantially composed of a material selected from the group consisting of amorphous silicon, amorphous selenium, antimony trisulphide, cadmium sulphide and antimony sulphide oxysulphide. The electron optics of the tube generates a low velocity electron beam which is directed in raster fashion at the photoconductor so that an electronic image from high energy radiation directed at the target is acquired at the signal plate for transmittal to the video readout circuit. This combination comprising a layer of CsI plus an adjacent photoconductive layer will be designated as the CsI+ sensor-target.

The distance between the signal plate and the mesh is much greater than for conventional TV tubes, being e.g., as much as 10 mm or more. The signal plate may also be divided into a plurality of sectors. Each of the sectors may be electrically connected with a corresponding preamplifier or the sectors may be multiplexed to a single preamplifier. The CsI+ sensor-target (as well as TlBr) can be used not only in very large diameter tubes such as 635 mm, but also in conventional small diameter tubes. The CsI layer may be doped with Na or Tl. The CsI layer has a thickness that depends upon the X-ray or gamma ray energy requirement of the application.

In another embodiment of the invention, the sensor-target comprises a photoconductive layer substantially composed of TlBr, TlI or a mixture of TlBr and TlI, $PbI_2$, $PbBr_2$ or a mixture of $PbI_2$ and $PbBr_2$. The TlBr, TlI, $PbI_2$, and $PbBr_2$ layers function as an X-ray or gamma ray sensitivity photoconductor. The latter layers do not require a scintillator such as CsI to sense the high energy radiation. The TlBr, TlI, $PbI_2$ or $PbBr_2$ layer has a thickness matched to the X-ray energy needed for an application and can be used in tubes of small and large diameters.

The high energy imaging tube in one embodiment employs a blocking layer which is disposed between the signal plate and the photoconductive layer for blocking the injection of holes from the signal plate into the photoconductive layer. The blocking layer is substantially composed of n-type conductive material. The metal/n-type junction, when forward biased (i.e. signal plate positive), promotes electron flow to the signal plate and blocks hole flow from the signal plate into the n-type material forming a hole blocking layer. A beam landing layer for inhibiting secondary electron emission from the photoconductor may also be deposited at the vacuum side of the photoconductive layer. The beam landing layer which may be substantially intrinsic or n-type can also serve as an electron blocking layer to inhibit electron injection into the photoconductor.

The large area imaging system may further include an image processor and a film write to provide a hardcopy readout of the electronic image. An interactive video display for the electronic image may also be provided.

A high energy imaging system provided by the invention employs a high energy source for directing radiation at an object or subject. The radiation which passes through the object is projected onto the surface of the X-ray sensitive video camera tube which may have a diameter greater than 50 mm. The camera tube comprises a vacuum tube which houses a sensor-target. The tube includes electron optics for generating a low velocity electron beam and directing the beam in raster fashion at the sensor-target. The electron beam in tracing out a raster deposits a uniform surface charge of electrons. The sensor-target absorbs the high energy radiation of the imaging beam, causes electrons to be removed and results in a new charge distribution which is an electronic reproduction of the X-ray photon distribution, i.e., the intrinsic X-ray image. The electron beam in scanning out a subsequent raster replaces the missing electrons and in the process on a pixel by pixel basis causes a video signal to pass through the signal plate. An image acquisition circuit electrically communicates with the signal plate for acquiring an electronic image of the object in substantially one to one spatial correspondence.

An object of the invention is to provide a new and improved large area X-ray and gamma ray sensitive camera tube which is suitable for application to areas such as diagnostic radiology, nuclear medicine and non-destructive testing.

Another object of the invention is to provide a new and improved large area high energy sensitive camera tube having an efficient construction and which is suitable for superior imaging for diagnostic radiology, nuclear medicine, and non-destructive testing applications.

Other objects and advantages of the invention will become apparent from the drawings and the specification.

DETAILED DESCRIPTION OF THE PREFERRED EMBODIMENTS

With reference to the drawings wherein like numerals represent like parts throughout the figures, a video camera system incorporating a low velocity electron beam type tube 10 (LV-type tube) in accordance with the present invention is generally designated by the numeral 12. The video camera system is adapted provide an imager suitable for applications which range from high energy X-ray and gamma ray radiation to lower energy electromagnetic spectral regions. In particular, the video camera system provides a large area, direct (1:1) type image (where refracting optics are impractical) which is suitable for diagnostic radiology, nuclear medicine and non-destructive applications. The LV-type tube 10 overcomes conventional limitations which are presented by large target area and large stray capacitance. The LV-type tube 10 is adapted to function as a large area imager which does not require magnification and typically has a diameter which ranges from greater than 50 mm to 635 mm or more. The tube 10 has particular applicability for applications involving high energy imaging radiation in excess of 5 KeV.

Figure 1:
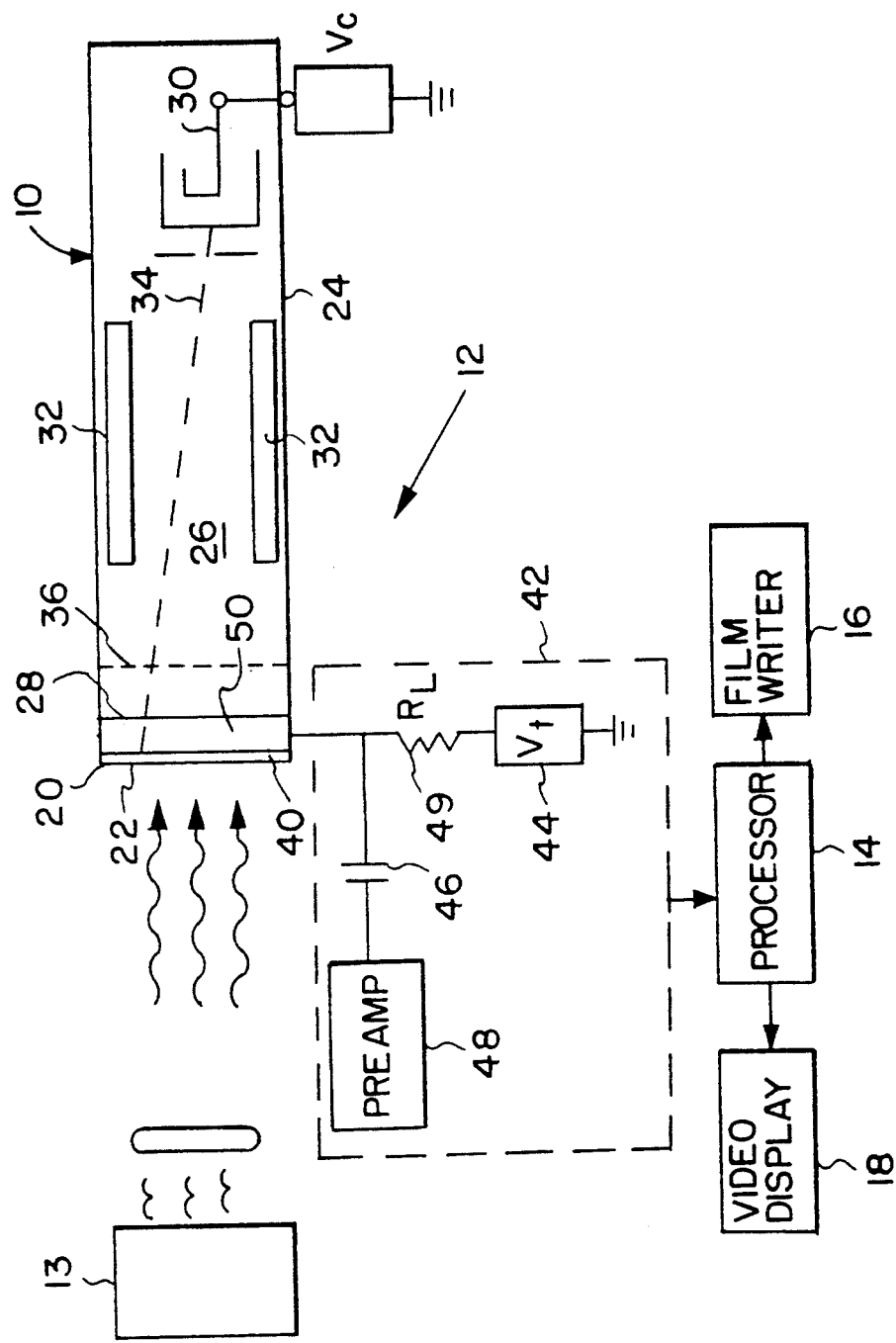
FIG. 1 is a schematic view of a video camera system incorporating a large area imaging tube in accordance with the present invention.

With reference to FIG. 1, the LV-type tube 10 generally comprises a sensor-target 20 having an input surface 22 to which imaging radiation, such as, for example, X-rays from a high energy source 13 are directed. The sensor-target 20 for these applications generally has a diameter greater than 50 mm and may range up to 635 mm or more. The tube has a vacuum sealed housing 24 which forms a vacuum cavity 26. The tube employs an electron cathode gun 30 and electron optics 32 for deflecting or directing an electron beam 34 toward the sensor-target. The gun 30 is preferably a laminar flow gun or a dispenser cathode gun used in TV camera tubes which has a modified aperture and generates a beam current greater than 10 microamps and preferably in the range of 20–30 microamps. An electrode grid or mesh 36 is disposed in the vacuum cavity between the sensor-target 20 and the gun 30. A transparent conducting substrate 40 functions as both a signal plate and an electrode for application of a bias voltage to the sensor-target. The electron gun operates generally at cathode potential $V_C$. A positive bias voltage $V_T$ with respect to the gun is applied to the electrode.

The electrode 40 is connected to a video read-out circuit 42. The read-out has a voltage source 44 which biases the electrode at $V_T$ above cathode potential. A capacitor 46 carries the video signal acquired at signal plate 40 to a preamplifier 48. A resistor 49 functions as a load resistor.

The electronic image is processed in a processor 14. A film writer 16 provides a hard copy read out of the electronic image. The electronic image may be processed and displayed on an interactive video display 18 and placed in digital archival storage.

The sensor-target 20 has two key attributes. First, the sensor-target 20 has a very high resistivity to store electrons (conventionally $10^{12}$ to $10^{14}$ ohms cm). Second, the sensor-target 20 is also a photoconductor. Upon exposure to electromagnetic radiation in the form of light, X-rays, infrared, etc., the sensor target generates mobile charge carriers throughout its interior in the form of electrons and holes. The electron beam 34 traces out a raster across the vacuum side of the sensor-target and deposits electrons which reside on the surface 28 exposed to the vacuum. The negative charge which is stored on the surface 28 is at the cathode potential $V_C$ of the electron gun 30.

Photons in the incident electromagnetic radiation are absorbed by the sensor-target 20 which generates electrons and holes in response to the photon absorption. The holes move to the tube vacuum surface. The holes combine with stored electrons at the vacuum surface 28 thereby resulting in a net reduction of the localized charge. The electrons which are generated by the absorbed photons move in the opposite direction. The electrons pass out of the photoconductor into the transparent electrode or signal plate 40. Charge neutrality is maintained by the simultaneous removal of the electrons from the body of the photoconductor as the electrons are removed from the storage surface. When an image from a scene is projected onto the input surface of the photoconductor, a resultant charge distribution occurs on the vacuum surface 28. The charge distribution is essentially an electronic reproduction of the original photon image.

When the electron beam 34 scans the surface 28 of the sensor-target, the beam essentially views a positive charge distribution due to the removal of the stored electrons from exposure to the original photon image. The electron beam therefore replaces the missing electrons during the scan and recharges the surface to the cathode gun potential $V_C$. A video signal is generated during the time sequence process of replacing the charge on a pixel by pixel basis. The signal plate electrically connects with the video readout circuit 42 to complete the readout of the acquired image.

For low velocity electron beam operation, the voltage biases are selected to satisfy the condition that the energy of the electrons in the beam 34 be sufficiently low when arriving at the scanned surface 28 of the photoconductive layer to not cause any secondary electron emission. Typically, the electrode bias $V_T$ may be set below the secondary emission threshold of the target material with respect to the gun cathode bias $V_C$. The mesh 36 disposed in front of the target surface is set to a positive potential (generally 1000 to 10,000 volts) to form an electron lens for electron deceleration and orthoginal beam landing. Electrons deposited on the inner surface 28 cause the voltage to approach the voltage $V_C$ of the cathode.

Figure 2:
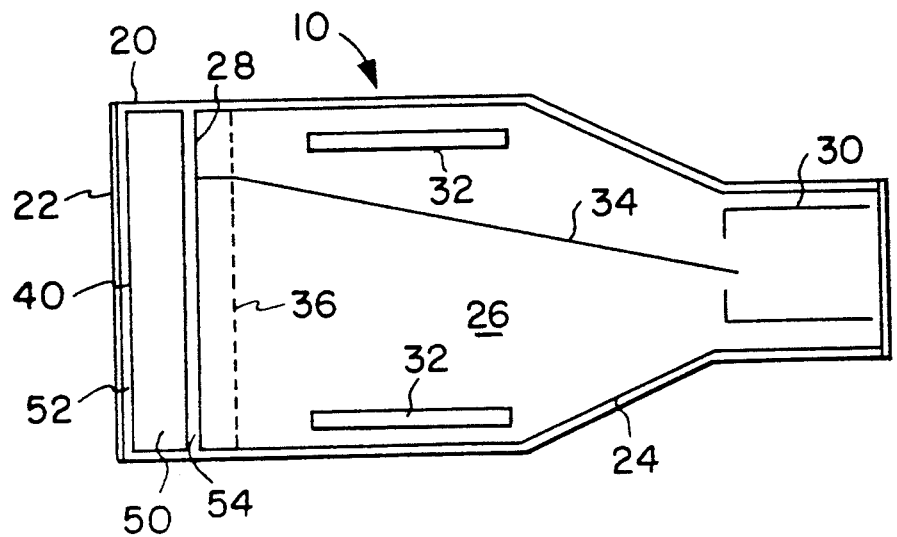
FIG. 2 is an enlarged sectional view, partly in schematic, of the large area imaging tube of FIG. 1.

With reference to FIG. 2, the sensor-target 20 of LV-type tube 10 employs a photoconductive layer 50 of TlBr. The TlBr substrate is deposited on a rigid substrate 52 which is highly transparent to the incident imaging radiation and is structurally capable of providing a stationary sensor-target supporting layer. For applications where the incident radiation is in the form of X-rays, the support layer 52 can be a metal known to be transparent to the radiation. The support layer 52 may also function as the signal plate. The sensor-target 20 is an efficient structure since the TlBr substrate 50 functions as both the sensor and the target. One or more blocking layers 54 (only one illustrated) may be deposited on the surfaces of the TlBr substrate to ensure proper transport properties of the electrons and holes which pass through the photoconductor. The photoconductive layer 50 has a diameter which is typically greater than 50 mm and a thickness on the order of approximately a few microns to 500 microns, depending upon the energies of the photons to be imaged. In some applications the layer 50 has a thickness as great as 1000 microns. Alternatively, layer 50 may be composed of TlI, a mixture of TlI and TlBr, $PbI_2$, $PbBr_2$ or a mixture of $PbI_2$ and $PbBr_2$.

The approximate percent of energy absorption for selected layer thicknesses of TlBr at selected energy levels is set forth in Table I.

TABLE I

| Energy (KeV) | 25 | 50 | 100 | 200 |
|---|---|---|---|---|
| Thickness (Microns) | | | | |
| 100 | 95 | 45 | 32 | 6 |
| 200 | 100 | 70 | 53 | 11 |
| 300 | 100 | 84 | 68 | 17 |

Figure 3:
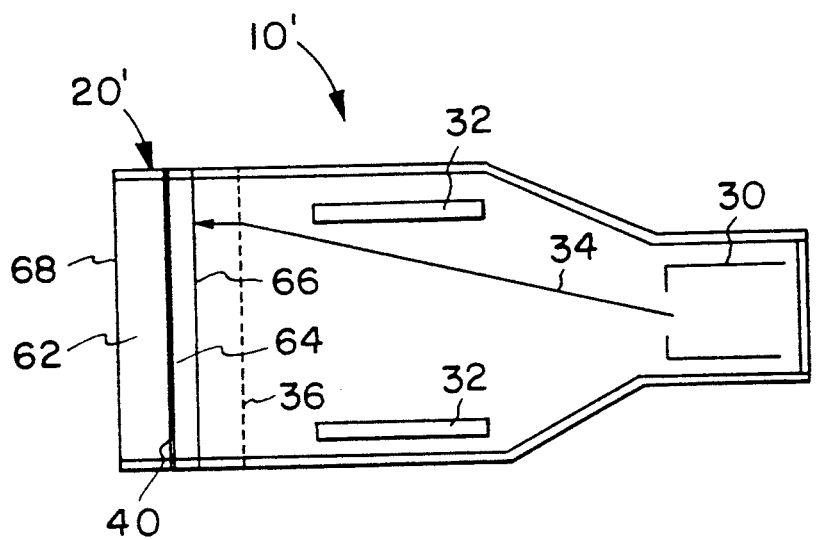
FIG. 3 is an enlarged sectional view, partly in schematic, of a second embodiment of a large area imaging tube in accordance with the present invention.

With reference to the LV-type 10' illustrated in FIG. 3, the sensor-target 20' has a sandwich-type configuration comprising a sensor layer 62 and a separate photoconductive layer 64. Layer 62 is a substrate of CsI which functions as the sensor for detecting the incident high energy radiation. The CsI layer 62 commonly has a thickness in the range of 50 to 400 microns. In some applications the CsI layer may have a thickness as high as 1000 microns. The CsI substrate essentially functions as a scintillator. A second substrate, which may be substantially composed of amorphous silicon, functions as the photoconductive layer 64 and is responsive to light from the scintillator 62. The photoconductive layer 64 serves as the target for the electron beam of the video tube. The incident high energy radiation is absorbed by the scintillator, e.g., CsI substrate, which causes the substrate to emit light photons. The photons pass through the transparent (or optical filter) conducting thin layer signal plate 40 and are absorbed by the light sensitive amorphous silicon. This results in a corresponding loss of charge on the storage surface 66 of the photoconductor. The charge loss occurs on a pixel by pixel basis proportional to the intensity of radiation in each pixel of the image which is projected onto the input surface 68 of the CsI substrate. The redistribution of charge is in turn read out by the scanning electron beam which results in the video signal passing through the signal plate 40 to the capacitively coupled preamplifier 48.

The CsI in the scintillator layer 62 may be doped with Na to provide a predominantly blue light emission or alternately Tl which produces a predominantly green light emission. The photoconductive layer must have a high resistivity. In addition to amorphous silicon, other photoconductors may be used such as amorphous selenium, antimony trisulphide, cadmium sulphide and antimony sulphide oxysulphide. These can be used with CsI (Na) or CsI (Tl) to implement the best spectral matches. Other candidates include lead oxide, cadmium selenide, and a selenium layer doped with layers of arsenic and tellurium.

For the vast majority of conventional video tube designs, as the diameter of the tube increases, the stray capacitance between the proportionally enlarged signal plate 40 and the immediate surroundings produces an unacceptable signal roll-off at the higher spatial frequencies. The unacceptable stray capacitance is primarily a result of the coupling between the signal plate 40 and the mesh 36. Electronic compensation for the signal roll-off results in an increased electronically induced noise which is directly proportional to the stray capacitance and to the video band width raised to the power of 1.5. As the diameter of a related conventional tube increases and all other relevant components proportionally increase, the stray capacitance problem proportionally increases to a level wherein the tube is not capable of functioning within acceptable performance standards for high energy radiation. This problem which has defeated prior attempts to develop large area video tubes has been solved in this invention as described below.

Figure 5:
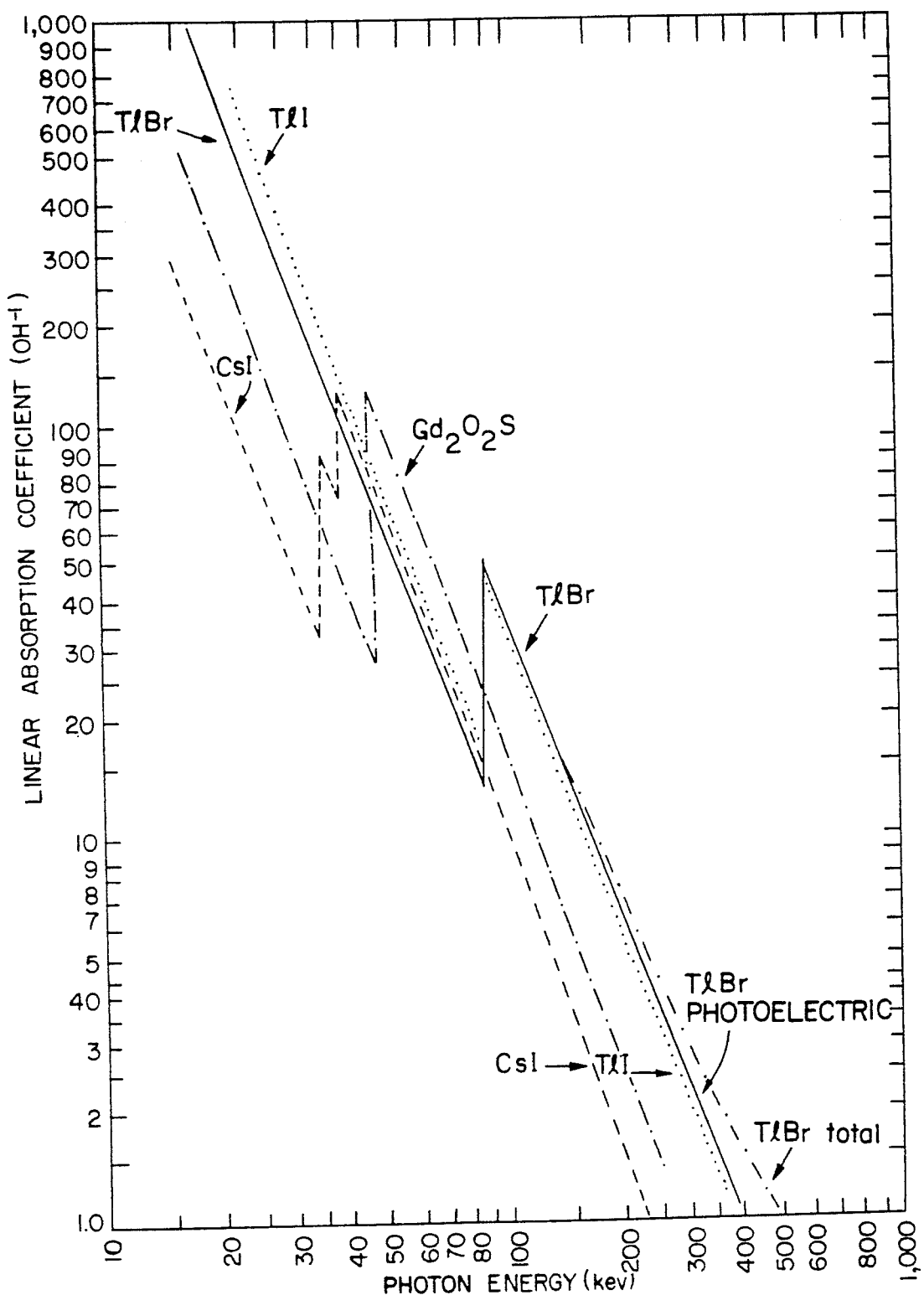
FIG. 5 is a graph of the linear absorption coefficient as a function of photon energy for CsI, TlI, TlBr and $Gd_2O_2S$.

The suitability of CsI and TlBr as sensor-target materials for large area applications can be demonstrated. A common material used as a sensor layer in conventional screen-film radiology is gadolinium oxysulphide. An energy dependent comparison between CsI, TlBr and $Gd_2O_2S$ (gadolinium oxysulphide), can be made on the basis of their respective linear absorption coefficients, as illustrated in FIG. 5. CsI and TlBr have approximately the same linear absorption coefficients between 35.98 and 85.43 keV, which correspond to the k energy level edges of Cs and Tl, respectively. Although $Gd_2O_2S$ appears to be superior over CsI and TlBr for most of the noted range, $Gd_2O_2S$ has only been prepared in the form of a phosphor powder screen. The thickness of $Gd_2O_2S$ is limited by the functional constraint wherein the light emitted by each phosphor particle must pass through the screen thickness separating the particle from the output surface and, therefore, the $Gd_2O_2S$ material exhibits undesirable scattering. Consequently, there is less light output and a reduced modulation transfer function (MTF) for $Gd_2O_2S$ in comparison to CsI and TlBr for higher energy (thick screen) applications. In addition, the density of the screen of $Gd_2O_2S$ is approximately half that of its intrinsic, crystalline bulk density. Both CsI and TlBr may be applied as a film having a bulk density configuration. CsI is thus superior to $Gd_2O_2S$ as an absorption substrate material for most energies employed in diagnostic radiology, including mammography. TlBr is superior to CsI and $Gd_2O_2S$ as an absorption substrate material for energies above 85.5 keV and below 35.98 keV.

The linear absorption coefficient of CsI and the established CsI film thickness characteristics exhibited in commercial X-ray intensifiers represent important considerations which confirm that CsI is a suitable sensor substrate material for larger area applications. The absorption energy dependent response (DQE) of the CsI-photoconductor video tube is determined by the linear absorption coefficient of CsI as well as the thickness of the CsI film. X-ray image intensifiers by Thomson CSF and by Siemens employ CsI films which are approximately 400 microns. The 400 micron layer provides very favorable limiting spatial resolution of 8 to 12 lp/mm. A 400 micron layer has a DQE of approximately 70% at 60 keV. CsI films have been made in thicknesses of up to 800 microns without appreciable loss of spatial resolution.

By extrapolating from established measurements at approximately 36 keV, the X-ray absorption for a 300 micron CsI film should be approximately 98%. For mammography applications at 18.5 keV, the absorption should exceed 98%. These absorption levels are believed superior to analogous levels that are achievable with current conventional rare earth screens or storage phosphor plates. Photon absorption becomes extremely high for 800 micron CsI layers. Based on the assumption that X-ray scattering is not significant in a CsI layer, an 800 micron thick CsI layer should provide a DQE of as high as 24% at 180 keV with an expected high spatial resolution of 8 to 10 lp/mm.

The approximate percent of energy absorption for selected layer thicknesses of CsI at selected energy levels is set forth in Table II.

TABLE II

| Energy (KeV) | 25 | 50 | 100 | 200 |
|---|---|---|---|---|
| Thickness (Microns) | | | | |
| 100 | 55 | 50 | 10 | 1 |
| 200 | 80 | 75 | 18 | 3 |
| 300 | 91 | 88 | 26 | 4 |

The foregoing described sensor-targets 20 and 20' are capable of recording a diagnostic radiographic image without magnification. For example, a typical chest X-ray presents an average effluence at the sensor-target of 300,000 X-ray photons per square mm having an average energy of about 60 keV. The sensor-target 20' must be able to detect 300 million light photons per square mm based on the assumption that CsI has a gain of 1,000 for 60 keV photons. Therefore, the charge storage capacity of the target must exceed 300 million electrons per square mm. The storage capacity requirements are clearly satisfied for both sensor-targets 20 and 20'. A silicon sensor-target stores in excess of 800 million electrons per square mm. TlBr stores approximately three times as much as a comparable silicon layer. A sputtered, high resistive layer of cadmium sulphide operating in a charge depleted mode is known to have a charge storage capacity approximately 60 times greater than silicon.

In addition, based on the previously described calculations the magnitude of the actual signal current for sensor-targets 20 and 20' is estimated to be on the order of 10-20 microamps. High resolution monitors employ electron beams having currents which range from 1-100 microamps and diameters which range from 1-50 microns. Thus, the electron optics for an X-ray video tube and the radiological requirement of a signal current in the range of 10-20 microamps with a spot diameter in the range of 1-50 microns can be relatively easily matched for sensor-targets 20 and 20'.

TlBr is a particularly suitable sensor-target material since a single layer serves as both the sensor and the target and offers the potential of a significant manufacturing cost savings. TlBr also has a very large dielectric constant which makes it suitable for high density charge storage per unit volume applied voltages. The TlBr medium also provides a much greater gain than CsI for each X-ray or gamma photon which is absorbed. In addition, the TlBr medium may be employed as a sensor-target in connection with a gain control by varying the bias potential.

The suitability of TlBr for large area high energy applications can be confirmed by extrapolating from established data relating to conventional small area detectors. K. S. Shah et al in "Thallium Bromide Radiation Detectors" IEEE Trans. on Nucl. Sci. 36, No. 1,199 (1989) disclose a small area TlBr detector. The TlBr detector is fabricated from crystals grown through a process of purification using multiple passes through a zone refiner. The detector has a 250 micron thick TlBr substrate with an area of 5 square mm and a resistivity of $5 \times 10^{12}$ ohm-cm. The detector resolved gamma radiation peaks at 60, 213 and 660 keV, and detected gamma and X-ray radiation from 0.006 to 1 MeV. The energy needed to create an electron-hole pair was determined to be approximately 6.5 eV/pair. The latter energy is less than required to generate a scintillation in luminescent detectors, such as cesium, iodide, calcium tungstate and gadolinium oxysulphide. Consequently, the gain is significantly higher for TlBr than for scintillators used in radiology. In addition the mobility-lifetime product of holes and electrons in TlBr has been determined to be 2 and $3 \times 10^{-6}$ cm$^2$/V, respectively.

When TlBr. is employed as a composite medium of the sensor-target 20 in an LV-type tube, the TlBr operates in a significantly different fashion than does the TlBr material which is employed as a photoconductive elemental detector. The TlBr substrate 50 just store a charge on its surface for a period of time which does not depend upon the frame rate. Radiation exposures for many applications may be quite low in terms of photons per pixel, such as when low light level imaging is accomplished with visible or near infrared photons. Because of the low light level applications, it is necessary to incorporate gain to insure the radiation induced noise dominates over the system noise. However, the gain cannot be too high since excessive gain potentially can overly deplete the stored electrons and limit the number of photons imaged to fewer than required in an exposure to achieve a pre-established image quality specification.

The described video tube application imposes a number of significant constraints which must be satisfied by the TlBr substrate 50. The constraints include the amount of charge that can be stored on the surface of the sensor-target, the exposure levels required for an application, the gain, the exposure time, read-out rate and raster rate. The large area tube 10 incorporating the TlBr sensor-target 20 satisfies the noted constraints as will be detailed below.

The charge that can be stored on the surface of a material can be determined from the following formula:

$$\sigma = k\epsilon_0 E$$

where:
$\sigma$ is the charge stored in coulombs per square meter
k is the dielectric constant of the material
$\epsilon_0$ is the permittivity of free space
E is the electric field strength in volts per meter It can be calculated, based on a comparison with established values for a potassium chloride target and a silicon target, that a TlBr film, when operating with a maximum field strength, stores an approximate charge of $2.2 \times 10^9$ to $10^{10}$ electrons per square mm.

For scintillators such as CsI and the rare earth phosphors, the gain has been established to be on the order of 500 to 1000 in response to radiation from 30 to 60 keV. The noted scintillators require approximately 30 electron volts of energy per scintillation created. In a photoconductor, the event is an electrical pulse associated with current or voltage. K.S. Shah et al in "Thallium Bromide Radiation Detectors", IEEE Trans. on Nucl. Sci. 36, No. 1,199, (1989) have determined that 6.5 electron volts are required to generate an electron hole pair for TlBr which leads to a gain of approximately 4,615 for a 30 keV photon. The latter gain is very favorable for creating a detectable electrical pulse for an absorbed X-ray or gamma ray photon in the TlBr photoconductive detector.

The inorganic lead compounds $PbI_2$ and $PbBr_2$ have excellent linear absorption characteristics for X-ray and gamma ray radiation and are relatively easy to fabricate as photoconductive layers 50 suitable for the sensor-target. In lower energy ranges below 33.166 keV, $TlI_2$ and $PbI_2$ have linear coefficients that are smaller but on the same order as CsI. $PbI_2$ requires only approximately 4.5 eV to generate an electron-hole pair and consequently has a high gain potential. The resistivity of $PbI_2$ exceeds $10^{13}$ ohm-cm.

The magnitude of the charge storage and the gain when combined must provide a usable signal level and clearly function with the exposure level required for the given application. If the gain is too high, the sensor-target will exhibit significant exposure level limitations. If the gain is too low, the generated video signal will not be processable to create a satisfactory image. A measure of the number of photons that can be detected can be estimated from the ratio of the charge stored to the gain. Using the previously described TlBr storage capacity of $2.2 \times 10^9$ to $10^{10}$ and a gain of 4,615 and a photon exposure in the range of $4.7 \times 10^5$ to $2.2 \times 10^6$ photons per square mm, which is very suitable for diagnostic radiology. A CsI sensor with an amorphous silicon target combine to provide storage of $10^9$ electrons per square mm with a gain of 1000 leads to X-ray and gamma ray exposures of approximately $10^6$ photons per square mm. Mammography imaging conventionally involves an exposure of $3 \times 10^5$ photons at about 18.5 keV. The charge storage and gain capabilities of both TlBr and CsI-amorphous silicon sensor-targets will thus satisfy a wide variety of applications. For non-destructive testing applications which require higher exposure levels, successive frames may be read out with each exposure set for a level acceptable for the sensor-target.

For diagnostic radiology applications, the larger the diameter of the tube, the more relaxed the requirement for spatial resolution. The very largest diameter tubes for imaging the chest and the abdomen require a limiting resolution of only 5 lp/mm (line pairs per mm) because the imaging can be accomplished without any demagnification. The relaxed spatial resolution results in the video pixel element becoming larger and storing a much larger charge quantity which translates into a corresponding larger signal. Under ideal conditions, the increased pixel size for radiology permits a tube to be scaled up in diameter without reducing the signal to noise ratio. Under less than ideal conditions, scaling can be augmented by other means to achieve a radiation noise limited image.

The readout and raster rates of X-ray and gamma ray sensitive video tubes are governed by considerations analogous to considerations for light sensitive video tubes. As the tube diameter increases, the sensor-target diameter and the stray capacitance increase. The stray capacitance leads to increased noise characteristics which may be resolved by a slow scan readout. For applications wherein the video camera tube diameters exceed approximately 125 mm, the slow scan readout becomes a significant limitation.

An illustrative model may be constructed for a $400 \times 400$ mm$^2$ imaging area ($16 \times 16$ inches$^2$), which is analogous to the $14 \times 17$ inch format of present radiology screen-film. It can be demonstrated that an LV-type video camera tube capable of meeting practical performance standards for diagnostic radiology can be constructed if the tube incorporates an appropriate selection of pixel size, target capacity and stray capacitance. The resulting signal noise for the large tube is sufficiently large to handle the dynamic range of the intrinsic X-ray image. In addition, the image is acquired in a time suitable for medical practice.

For the video camera tubes 10 and 10' wherein the tubes have a 566 mm diagonal dimension, the relative areas of the 566 mm diagonal radiological tube compared to a conventional 38 mm video camera-type tube is approximately 220. Accordingly, the signal capacity of the 556 mm diagonal tube should increase by a factor of 220. If the large tube pixel format is $512 \times 512$ (as used in the conventional small diameter video tube), and since the pixel area (0.0027 mm$^2$) for the conventional tube and capacitance would increase by the same factors as the stray capacitance, the resultant signal to noise ratio would be approximately the same.

Excellent spatial resolution for the chest and the abdomen requires a pixel of approximately $0.1 \times 0.1$ mm$^2$. The pixel area ratio (0.01/0.0027) compared to the small tube resolution is approximately 3.7. The 3.7 ratio is less than the required ratio of 220. However, increased signal is also achieveable by increasing the capacity of the target to store electrons. The pixel area factor is only one of the three important signal factors which also include dielectric constant and thickness.

Silicon has a dielectric constant higher than most photoconductors used in conventional video tubes. For example, assuming a limiting spatial resolution of 5 lp/mm (0.1 mm pixel) for $4000 \times 4000$ pixels in an area of $400 \times 400$ mm$^2$ and a thickness of 10 microns, the capacity per pixel becomes $$\begin{aligned}
C_{pixel} &= A_{pixel} \times \text{permittivity of freespace} \times \\
&\quad \text{dielectric constant/thickness of the target.} \\
&= 10^{-8} \text{ m}^2 \times 8.85 \times 10^{-12} \text{ farads per meter} \times \\
&\quad 12/10^{-5} \text{ meters} \\
&= 0.106 \text{ pF/pixel}
\end{aligned}$$

The number of electrons that will be stored in a pixel depends upon the charge storage potential. One embodiment of the low velocity electron optics 32 has a target potential swing of 10 to 20 volts. A 15 volt potential swing results in a stored charge of:

$$Q_{pixel} = CV = 0.105 \times 10^{-12} \times 15 = 1.575 \times 10^{12}$$
coulombs per pixel Dividing this charge by the charge of an electron, gives $$e_{pixel} = 1.575 \times 10^{-12} / 1.6 \times 10^{-19} = 9{,}843{,}750 \text{ electrons/pixel}$$

This quantity must be compared to the electrons stored per pixel in a conventional 1.5 inch (38 mm) PbO image tube. The total target capacitance of this small tube is 900 pF and is usually scanned to a 512×512 pixel array in 1/30 second. The inscribed target area is equal to 725 mm². Accordingly, the capacitance per pixel is given by:

$$C_{pixel} = C_{total}/\text{No. of pixels} = 900 \times 10^{-12} / 512^2 = 0.0034 \text{ pF}$$

The charge per pixel is based on a 5 volt swing in a practical tube and is given by:

$$Q_{pixel} = C_{pixel} V = 0.0034 \times 5 = 1.7 \times 10^{-14} \text{ coulomb per pixel} = 106{,}250 \text{ electrons per pixel}$$

The ratio of the charge that can be stored in the large area pixel to the charge stored in the small area pixel is given by:

$$e_{ratio} = e_{pixel\ CsI\text{-}Si} / e_{pixel\ PbO} = 92.6$$

The latter ratio is deficient of the 220 factor required for linear scaling by a factor of only 2.37. One suitable compensating approach is to reconsider the pixel format. If each pixel has its storage capacity increased by a factor of 4 by channeling the digital format from 4000×4000 to 2000×2000 pixels for the same imaging area of 400×400 mm² and reading out in less time when necessary, the limiting spatial resolution is reduced to 2.5 lp/mm.

There are other options which may be employed to either increase the pixel signal or decrease electronically induced noise. Signal current depends upon the readout time per pixel. A typical real time read out rate per pixel of 125 nsec/pixel and 4000×4000 pixels results in a readout time of 2 seconds. The signal current that can be generated from the charge stored per pixel is then given by:

$$i = dq/dt = 12.6 \text{ microamperes}$$

While the 12.6 microamperes per current is large compared to that conventionally found in small tubes, e.g., 0.5 to 1.0 microamperes, the large signal current is compatible with contemporary beam cathodes. Although electron beam density at the sensor target surface would be a source of problems in the small tube applications because of electron repulsion causing a loss of spatial resolution, for the described reduced spatial resolution requirement, electron repulsion is not a significant problem. In one embodiment, the peak signal current may range from 10-20 microamperes.

The noise associated with this signal is derived by computing the number of electrons in the large area pixel which has previously been determined to be $9.84 \times 10^6$ electrons or $9.84 \times 10^3$ photons assuming a gain of 1000. The X-ray background noise is given by the square root of the quantity which would be approximately 99.2 photons. Photon induced noise given by:

$$i_{photon\ noise} = \text{Noise}_{photon} \times \text{electronic charge} \times \text{screen gain}/ \text{time per pixel (125 nsec)} = 127 \text{ na}$$

The close proximity of the mesh 36 to the signal plate 40 is the primary cause of stray capacitance. Stray capacitance grows linearly with area and causes a signal roll-off at the higher frequencies. The signal roll-off is compensated for by bandwith equalization in the amplifier to produce a higher gain at the higher frequencies. However, the latter compensation results in increased electronically induced noise. Assuming for example, a 2 na noise induced by stray capacitance of a small 35 mm conventional tube, the stray capacitance for a large tube and noise current could be expected to grow by the ratio of the areas, e.g., $(566/35)^2 = 261.5$ na. The latter derived noise current is 2.1 times larger than that due to the background noise and accordingly must be reduced.

In conventional small tubes, the mesh is placed in close proximity to the target (0.5-2.0 mm) to impart uniform orthogonal beam characteristics to the reading beam during low velocity readout and to provide 25 to 50 lp/mm spatial resolution. Since a radiology tube design only requires 5 to 10 lp/mm, the mesh 36 is positioned a greater distance from the sensor-target than in comparable small tube configurations. The distance between the mesh 36 and the target is preferably greater than 2 mm and generally increases as the diameter of the tube increases. Since the stray capacitance is inversely proportional to the separation distance between the mesh 36 and the sensor-target surface 28, any increased separation leads to a corresponding reduction in stray capacitance. For a tube having a diameter of 556 mm, the distance between the mesh and the target may be as great as or even greater than 10 mm. Increasing the separation by as much as 10 mm results in an imaging system which meets the relatively low spatial resolution requirement of chest radiology and correspondingly reduces the noise current to a satisfactory value.

By using the foregoing described large pixels for radiology applications, the DQE at the lower spatial frequencies will be significantly improved with a corresponding improvement in contrast resolution. The above-described example with a spatial resolution of 0.1 mm provides a smaller pixel than occurs with a digital image processing system having a 2048×2048 matrix spread over 400×400 mm², which gives a 0.2 mm pixel size. The latter offers an equivalent spatial resolution of 2.5 lp/mm with an excellent modulation transfer function of the imaging components of the tube.

For a signal current of 12.6 microamps, the beam shot noise is approximately 3.78 nanoamps. The preamplifier noise can be less than a few nanoamps. These latter values are very favorable for X-ray and gamma ray video tubes as described whose output can be fed to a digital imaging system.

Leakage current problems generally increase in proportion to the size of the video tube. The leakage current represents a substantially constant direct current-like current flow passing through the bias circuit. Fluctuations in the current flow are of a very low frequency and are not transmitted to the preamplifier 48 through the coupling capacitor 46. The current flow through the signal plate 40 is the sum of the simultaneous discharges from all of the pixels. Individually, each pixel discharge is only a small amount of charge during a raster period and does not effect the signal. The pixels recharge at the raster rate. An individual pixel which has an excessive discharge because of poor pixel resistivity only effects the video signal and the signal to noise ratio of the given pixel.

The primary negative consequences of leakage current is the degree of charge depletion on the surface of the sensor-target during a raster period. A potential shading problem could be introduced by such charge depletion. The charge depletion results in subsequent pixel read-outs having less charges than earlier pixels. If all of the charge leaks off before the beam has a chance to read a pixel, then there will not be any signal. The sensor-target in this regard, acts like a dielectric in a capacitor. The surface charge deposited by the electron beam will discharge from the surface in an exponential manner characterized by its RC time constant. The RC time constant is equal to the product of the resistivity and the permittivity. For an amorphous silicon sensor-target disclosed by C. Kusano et al entitled "An Amorphous Silicon Imaging Tube Using High Velocity Beam Scanning", IEEE Tans. on Elec. Div., ED-33, No. 2 p. 298, Feb. 1986, the resistivity is $10^{13}$ ohm cm and the dielectric constant is 12. The time constant for the material is 10.6 second. 36.7% of the initial charge remained on the target surface 10.6 seconds after the electron beam deposited the charge. Since the longest read-out time for the largest area tube designed for radiology of the chest and abdomen will be 2 seconds, the amount of charge remaining for the last pixel is 83% of the initial charge. Consequently, the reduction is acceptable. The results can also be dramatically improved by depositing electron and hole blocking layers 54 on the sensor-target 20. An alternative is to create a thin sputtered film of amorphous silicon having a higher resistivity of $10^{14}$ ohm cm (not illustrated). Such films may eliminate the need for blocking layers, or alternately may be employed in conjunction with blocking layers to decrease the leakage current by an additional factor of 5 to 10.

There are other alternatives to amorphous silicon for sensor-target materials to provide extended storage time and reduced leakage current. For example, an amorphous selenium-arsenic photoconductor sensor-target is employed in a Westinghouse ETV-2000 2 inch diameter television camera. The camera normally produces a 2048×2048 pixel image from a 25×25 mm$^2$ area on the photoconductor and can be readout in real time or slow scan. The leakage current is less than 0.5 nA/cm$^2$ at room temperature. Storage of images up to 10 seconds prior to readout is permissible. The exposure times can be as short as 300 ns and as long as several seconds. The pixel size is only 12.2×12.2 micron$^2$ and the number of electrons stored per pixel is 400,000. When the foregoing values are extrapolated to a 16"×16" X-ray tube, a low leakage current of 800 nA and a charge density of 3×10$^9$ e/mm$^2$ is obtained. The foregoing values do not present significant problems. The leakage current is a direct current which is essentially a noise free current that does not interfere with the video signal passed through to the preamplifier. The Westinghouse ETV-2000 camera has a dynamic range of 667:1 which is limited by the RMS noise figure and can be improved with new preamplifier technology. For the larger pixel areas for diagnostic radiology, e.g., 50×50 microns$^2$, the charge per pixel increases by a factor of about 16, so that the dynamic range of a practical tube can exceed 12 bits. Other materials which may be suitable photoconductors in combination with CsI for certain applications are CdS, Sb$_2$S$_3$, ASOS, cadmium selenide and a selenium-arsenic-tellurium composition. Although blocking layers may add to tube complexity and cost with respect to amorphous silicon, the layers are very thin films and are easily sputtered with a very high degree of uniformity.

For snap-shot imaging with very high spatial resolution, resistivities on the order of $10^{13}$ ohm-cm are desirable. Snap-shot imaging with high resolution rasters requires longer periods of time for readout. Thus, the storage time for the sensor-target must be increased. However, the increased storage time tends to be accompanied by an image degradation due to dark current. Accordingly, for some applications blocking layers are required. In addition, higher X-ray energy exposures require that the sensor-targets be thicker for optimum absorption and therefore require a corresponding increase in bias voltage. However, the increase in the bias voltage may also be accompanied by secondary electron emission.

Figure 6:
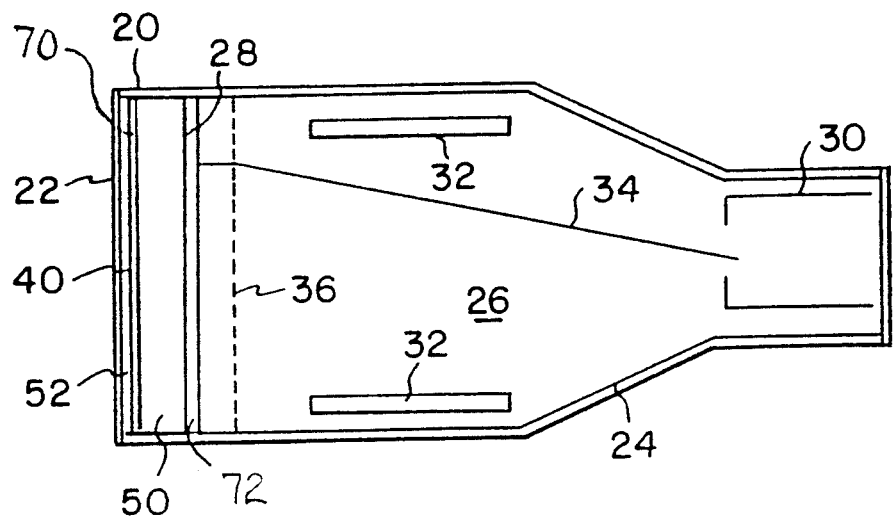
FIG. 6 is an enlarged sectional view, partly in schematic, of a third embodiment of an imaging tube in accordance with the present invention.

With reference to FIG. 6, a blocking layer 70 is interposed between the signal plate 40 and the photoconductive layer 50. The material composition for the blocking layer 70 is selected so as to inhibit the flow of holes and electrons in undesired directions to thereby minimize dark current. The bias voltage for a low electron tube velocity is applied so that the sensor-target substrate conductive surface is positive. The electron beam charges the opposite surface with electrons until the electrons reduce the cathode potential which is usually at ground. Thus, there is a tendency for electrons to leak from the charged surface through the sensor-target layer 50 to the sensor plate 40 and contribute to a dark current.

For real time imaging, the charge that leaks from the storage surface is replenished by charge replacement in a nearly continuous process as the electron beam scans through a raster. However, in snap-shot imaging there is a well-defined sequence of steps which make such imaging much more susceptible to electron leakage. In snap-shot imaging, the sensor-target surface is charged to an equilibrium value. This is followed by an exposure that generally occurs within milliseconds for diagnostic radiology. This exposure is followed by a raster readout and then subsequent recharging of the sensor-target surface to equilibrium value. The readout period depends on the number of pixels to be readout and the dwell time of the electron beam on each pixel. A high resolution raster of 4096×4096 pixels readout with a pixel dwell time of about 100 ns requires 2 seconds to readout the raster. It is desirable that the charge storage time of the sensor-target be at least ten times longer to ensure that the signal to noise ratio of the image is not degraded during readout process. The time constant for charge reduction is given by the product of resistivity and the dielectric constant of the sensor-target material.

The effective resistance of the sensor-target is effectively increased by blocking layer 70 which thereby functions to increase the storage time. Blocking layer 70 blocks the injection of holes from the signal plate 40 into the photoconductive layer 50. Blocking layer 70 may essentially have a thickness on the order of 5 nm to 100 nm and an n-type oxide composite such as cerium oxide, tungsten oxide, niobium oxide, germanium oxide and molybdenum oxide. Other materials and thicknesses may also be suitable. The blocking layer 70 is positioned between the signal plate 40 and the photoconductive layer 50 in the FIG. 6 embodiment and is preferably an n-type conductive layer since the sensor-target 50 is always biased positive for a low velocity electron tube.

Figure 7:
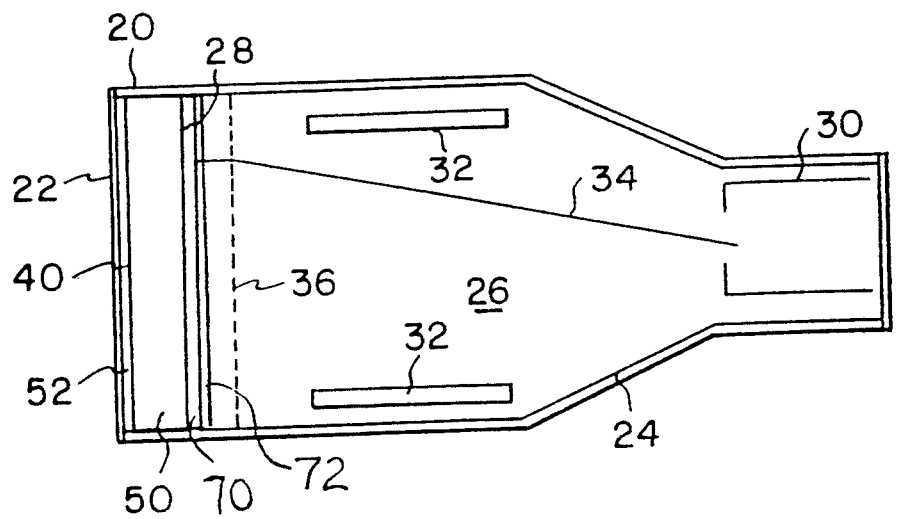
FIG. 7 is an enlarged sectional view, partly in schematic, of a fourth embodiment of an imaging tube in accordance with the present invention.

A beam landing layer may also coat the sensor-target photoconductive layer 50 at the vacuum surface 28. Beam landing layer 72 is employed to raise the secondary emission crossover potential to allow satisfactory bias voltages across the photoconductor. An electron blocking layer 70 substantially composed on an n-type material such as $CeO_2$ may be deposited on the photoconductive surface. If the cavuum surface of the photoconductor is doped $p^+$, a $p^+$-n junction is formed which provides hole flow to the vacuum side of the junction and inhibits electron flow from the vacuum side of the junction to the photoconductor. Further, a beam landing layer 72, which may be composed of a porous layer of $Sd_2S_3$, may be deposited on the blocking layer 70 as shown in FIG. 7.

For some applications, a combination of the hole blocking layer between the signal plate and the photoconductor as well as the electron blocking/beam landing layer combination may be employed.

In addition to the foregoing scaling approaches discussed above, there are additional techniques which will improve the characteristics for the large area video tube 10 for some applications. First, the tube can be transformed from a low velocity to a high velocity electron beam. Second, the target may be configured as a multiple layer target. Third, the distance between the sensor-target surface and the grid may be increased, as discussed earlier.

Figure 4:
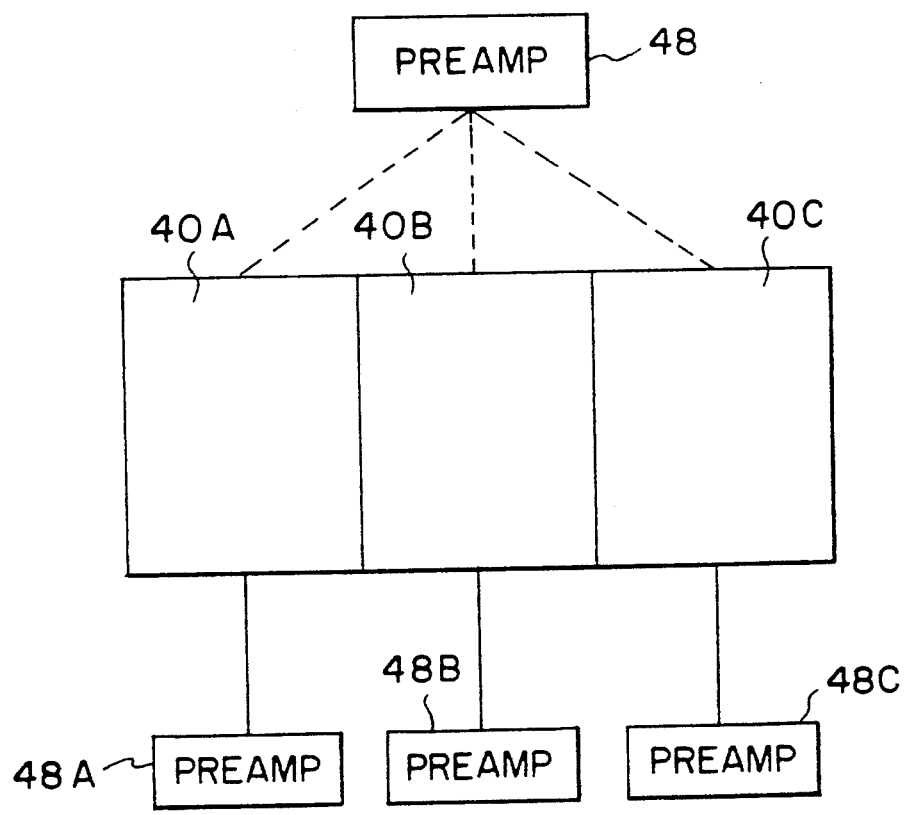
FIG. 4 is a schematic view illustrating a sectoring configuration which may be implemented in connection with the large area imaging tubes of FIGS. 2 and 3.

With reference to FIG. 4, the signal plate 40 may be sectored into plate sectors 40A, 40B and 40C which each have smaller areas. The sectoring of the signal plate reduces the target capacity being read out at any one time by the number of the sectors—all other relevant factors being unchanged. The cost is increased complexity due to multiplexing and/or additional preamplifiers. The improvement of slightly more than the factor of two described above could be overcome by sectoring the target into three parts, with each part connected to its own preamplifier 48A, 48B and 48C. Each preamplifier then feeds its output into one third of the total digital memory required for a complete image. This effectively reduces the stray capacitance by one third. Alternately, the sectors may be multiplexed to a single preamplifier 48. The advantages of the signal plate sectors are offset by the cost of additional camera complexity. The sectors could be arbitrary in shape with the most simple being square or rectangles.

It will be appreciated that large area LV-type video camera tubes (such as for a 56 mm raster diagonal) have been provided to meet the specifications required for applications to diagnostic radiology, nuclear medicine and non-destructive testing. This dimension is sufficient to provide a conventional 14"×17" format as used in diagnostic radiology. The sensor-targets provide acceptable response and performance to image photons with energies ranging from a few keV to MeV range energies. The electron optics of the LV-P type tube have been modified to achieve the necessary spatial resolution, noise, signal and dynamic range characteristics.

While the preferred embodiments of the invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An imaging tube comprising:
sensor-target means comprising signal plate means for detecting irradiating high energy photons and providing storage capacity to hold electrons on the surface of said sensor-target means, said sensor-target means comprising a layer substantially composed of material selected from the group consisting of $PbI_2$, $PbBr_2$ and a $PbI_2$ and $PbBr_2$ mixture, which layer receives incident high energy radiation and causes the generation of internal electronic positive carriers in quantities which are greater than the number of incident photons of said radiation;
electron optics means for generating a low velocity electron beam and directing said beam at said sensor-target means to deposit a uniform layer of charge;
so that high energy radiation directed at said sensor-target means produces a charge redistribution at said sensor-target means surface for generating a signal for transmittal to a read-out circuit.

2. The imaging tube of claim 1 wherein said sensor-target means has a diameter greater than 50 mm.

3. The imaging tube of claim 1 wherein said electron optics means further comprises a mesh, said mesh being spaced from said signal plate means a distance greater than 2 mm.

4. The imaging tube of claim 1 wherein said signal plate means comprises a plurality of sectors.

5. The imaging tube of claim 4 and further comprising a plurality of preamplifiers and wherein each of said sectors is electrically connected with a corresponding preamplifier.

6. The imaging tube of claim 4 wherein signals from each of said sectors are multiplexed to a single preamplifier.

7. The imaging tube of claim 1 and further comprising image processor means and film writer means to provide a hard copy read-out of said electronic image.

8. The imaging tube of claim 1 and further comprising video display means for providing a video display of said electronic image.

9. The imaging tube and display means of claim 8 and further comprising image processor means for processing said electronic image.

10. The imaging tube of claim 1 wherein said sensor-target means layer has a thickness in the range of 50 to 1000 microns.

11. The imaging tube of claim 1 further comprising blocking means to prevent electrons in said sensor-target layer from prematurely leaking to the signal plate.

12. The imaging tube of claim 11 wherein said blocking means comprises a blocking layer deposited on the sensor-target means.

13. An imaging tube comprising:
sensor-target means comprising signal plate means for detecting irradiating high energy photons and providing storage capacity to hold electrons on the surface of said sensor-target means, said sensor-target means comprising a photoconductive layer substantially composed of material selected from the group consisting of TlBr, TlI, $PbI_2$, $PbBr_2$, a TlBr and TlI mixture and a $PbI_2$ and $PbBr_2$ mixture, which layer receives incident high energy radiation and causes the generation of internal electronic positive carriers in quantities which are greater than the number of incident photons of said radiation;

electron optics means for generating a low velocity electron beam and directing said beam at said sensor-target means to deposit a uniform layer of charge;

blocking means comprising a blocking layer disposed between said signal plate means and said photoconductive layer for blocking the injection of holes from said signal plate means into said photoconductive layer, so that high energy radiation directed at said sensor-target means produces a charge redistribution at said sensor-target means surface for generating a signal for transmittal to a read-out circuit.

14. The imaging tube of claim 13 wherein said blocking layer is substantially composed of a n-type conductive material.

15. The imaging tube of claim 13 wherein said blocking layer is substantially composed of material selected from the group consisting of cerium oxide, tungsten oxide, niobium oxide, germanium oxide and molybdenum oxide.

16. The imaging tube of claim 13 further comprising reduction means comprising a beam landing layer deposited on said photoconductive layer for reducing secondary electron emission and for inhibiting the injection of electrons from said beam into said sensor-target means.

17. An imaging tube comprising:
sensor-target means comprising signal plate means for detecting irradiating high energy photons and providing storage capacity to hold electrons on the surface of said sensor-target means comprising a photoconductive layer substantially composed of material selected from a group of TlBr, TlI, PbI$_2$, PbBr$_2$, a TlBr and a TlI mixture, and a PbI$_2$ and a PbBr$_2$ mixture, which layer receives incident high energy radiation and causes the generation of internal electronic positive charge carriers in quantities which are greater than the incident number of photons of said radiation, said sensor-target means having an input side surface and an opposite vacuum side surface;

electron optics means for generating a low velocity beam and directing said beam at said sensor-target means to deposit a uniform layer of charge;

reduction means for reducing secondary electron emissions in said sensor-target means comprising a beam landing layer disposed between the vacuum side surface of the sensor-target means and said electron optics means, so that high energy radiation directed at said sensor-target means incident side surface produces a charge redistribution at said sensor-target means surface for generating a signal for transmittal to a readout circuit.

18. The imaging tube of claim 17 wherein said reduction means comprises a beam landing layer substantially composed of a p-type conductive material.

19. The imaging tube of claim 17 wherein said beam landing layer is substantially composed of a film of antimony trisulfide deposited on said vacuum side surface.

20. The imaging tube of claim 18 further comprising a blocking means comprising a blocking layer substantially composed of a n-type conductive material adjacent said vacuum side surface, said beam landing layer overlaying said blocking layer.

* * * * *